(12) United States Patent  
Yamanaka et al.

(10) Patent No.: US 11,079,805 B2  
(45) Date of Patent: Aug. 3, 2021

(54) DISPLAY PANEL PROVIDED WITH PROTECTIVE FILM

(71) Applicant: SHARP KABUSHIKI KAISHA, Sakai (JP)

(72) Inventors: Kazuyuki Yamanaka, Sakai (JP); Masayuki Ohhashi, Sakai (JP); Katsutoshi Kikuchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/624,888

(22) PCT Filed: Jun. 18, 2018

(86) PCT No.: PCT/JP2018/023094  
§ 371 (c)(1),  
(2) Date: Dec. 19, 2019

(87) PCT Pub. No.: WO2018/235772  
PCT Pub. Date: Dec. 27, 2018

(65) Prior Publication Data  
US 2020/0133346 A1    Apr. 30, 2020

(30) Foreign Application Priority Data  
Jun. 21, 2017 (JP) .............................. JP2017-121708

(51) Int. Cl.  
*G06F 1/16* (2006.01)  
*G09F 9/30* (2006.01)  
*H05K 5/00* (2006.01)

(52) U.S. Cl.  
CPC .......... *G06F 1/1656* (2013.01); *G06F 1/1637* (2013.01); *G09F 9/30* (2013.01); *H05K 5/0017* (2013.01)

(58) Field of Classification Search  
None  
See application file for complete search history.

(56) References Cited

U.S. PATENT DOCUMENTS 4,404,522 A * 9/1983 Pucciarello ............ G01D 11/28  
116/300  
5,881,024 A * 3/1999 Nishimura ............ G04G 9/0052  
368/67

(Continued)

FOREIGN PATENT DOCUMENTS

| CN | 104932042 A | 9/2015 |
| CN | 105842950 A | 8/2016 |
| JP | 2007-232911 A | 9/2007 |

*Primary Examiner* — Anthony Q Edward  
*Assistant Examiner* — Rashen E Morrison  
(74) *Attorney, Agent, or Firm* — ScienBiziP, P.C.

(57) ABSTRACT

A display panel provided with a protective film includes a display panel and the protective film that is provided on a display surface of the display panel, in which the display panel is provided with a first through-hole passing through the display panel in a thickness direction, the protective film includes a first protective film, the first protective film is provided with a second through-hole passing through the first protective film in the thickness direction, the first through-hole and the second through-hole are in communication with each other and form a through-hole, the first protective film includes a first grip portion at a peripheral edge portion of the first protective film, and the first protective film includes a dividing portion that continues from the second through-hole to an end side of the first grip portion.

5 Claims, 3 Drawing Sheets

(56) References Cited

U.S. PATENT DOCUMENTS

| | | | | |
|---|---|---|---|---|
| 5,915,822 | A * | 6/1999 | Ogura | G01D 13/28 362/23.18 |
| 6,276,809 | B1 * | 8/2001 | Matsumoto | G01D 11/28 362/23.15 |
| 6,959,995 | B2 * | 11/2005 | Ikarashi | G01D 11/28 362/23.2 |
| 7,093,948 | B2 * | 8/2006 | Fong | G01D 11/28 362/23.1 |
| 2003/0112712 | A1 * | 6/2003 | Ferri | G04B 19/042 368/238 |
| 2008/0129916 | A1 * | 6/2008 | Ota | G07F 17/3211 349/58 |
| 2010/0064961 | A1 * | 3/2010 | Masuda | G01D 11/28 116/286 |
| 2014/0293141 | A1 * | 10/2014 | Tsubokura | B60K 35/00 349/1 |
| 2015/0129880 | A1 | 5/2015 | Wu et al. | |
| 2016/0054636 | A1 | 2/2016 | Chiang et al. | |
| 2016/0154172 | A1 * | 6/2016 | Komano | G02B 6/0021 349/65 |
| 2017/0059771 | A1 * | 3/2017 | Yuki | G02B 6/0088 |
| 2017/0090113 | A1 * | 3/2017 | Yuki | G02B 6/0021 |
| 2017/0153486 | A1 * | 6/2017 | Ahn | G02F 1/1339 |
| 2019/0243058 | A1 * | 8/2019 | Kikuchi | G02F 1/133 |
| 2019/0369436 | A1 * | 12/2019 | Ohashi | G02F 1/133308 |
| 2020/0142242 | A1 * | 5/2020 | Kikuchi | G02F 1/133528 |

* cited by examiner

DISPLAY PANEL PROVIDED WITH PROTECTIVE FILM

TECHNICAL FIELD

An aspect of the present invention relates to a display panel provided with a protective film.

The present application claims priority based on Japanese Patent Application No. 2017-121708 filed in Japan on Jun. 21, 2017, the contents of which are incorporated herein by reference.

BACKGROUND ART

Display panels have been applied to display devices such as liquid crystal display devices and organic electroluminescence (EL) display devices.

Such display panels have a structure in which an optical film such as a polarizing film is adhered to a surface of an optical display component (for example, PTL 1). To maintain display characteristics of a display panel at a high level, for example, the optical film is required to have high quality in terms of strength, dust resistance, antifouling, and the like.

For example, a display panel provided with a protective film in which the protective film is provided on a surface of the optical film is a known configuration that ensures the optical film constituting the display panel maintains high quality. Here, the display panel provided with a protective film refers to a display panel having a protective film on a surface. The protective film is for protecting the surface of the display panel (for example, the surface of the optical film) and is removed before a product of the display device is completed.

CITATION LIST

Patent Literature

PTL 1: Japanese Unexamined Patent Application Publication No. 2007-232911

SUMMARY OF INVENTION

Technical Problem

Recently, demand for display devices such as smart watches and in-vehicle meters that use a display panel has increased. Regarding a display panel for a smart watch, an indication pointer for indicating the time is mounted on the display panel. In addition, regarding a display panel for an in-vehicle meter, an indication pointer for indicating a measured value is mounted on the display panel.

The display panel applied to such a display device is to be provided with a through-hole through which an indication pointer is inserted. In addition, a protective film used in a process of manufacturing the display device is also to be provided with the same through-hole. Therefore, development of a novel protective film for such a display device has been demanded.

An aspect of the present invention has been made in view of such circumstances, and an object of the present invention is to provide a display panel provided with a protective film that protects a display panel at the time of manufacturing a display device.

Solution to Problem

To solve the above problems, the inventors performed intensive investigations. As a result, even though a through-hole is provided in a protective film, there was a case where the protective film was not removable from a display panel provided with a protective film after an indication pointer had been mounted. The reason is that the mounted indication pointer obstructs the protective film such that the protective film is not removable from the display panel provided with a protective film.

To solve such a problem, the inventors tried a method of mounting the indication pointer after removing the protective film in advance. However, this method is not preferable because the display panel is damaged during the mounting of the indication pointer and foreign matter may adhere to the display panel.

Further examination by the inventors revealed that according to an aspect of the present invention, the protective film is easily removable from the display panel provided with a protective film after mounting the indication pointer, and an aspect of the present invention has been completed.

An aspect of the present invention provides a display panel provided with a protective film, including a display panel and the protective film that is provided on a display surface of the display panel, in which the display panel is provided with a first through-hole passing through the display panel in a thickness direction, the protective film includes a first protective film, the first protective film is provided with a second through-hole passing through the first protective film in the thickness direction, the first through-hole and the second through-hole are in communication with each other and form a through-hole, the first protective film includes a first grip portion at a peripheral edge portion of the first protective film, and the first protective film includes a dividing portion that continues from the second through-hole to an end side of the first grip portion.

In an aspect of the present invention, the protective film may include a second protective film on a surface of the first protective film opposite to the display panel, and the second protective film may cover at least the through-hole and the dividing portion.

In an aspect of the present invention, the second protective film may include a second grip portion at a position at which the second protective film does not overlap the first protective film in plan view.

Advantageous Effects of Invention

According to an aspect of the present invention, a display panel provided with a protective film that protects the display panel at the time of manufacturing a display device is provided.

DESCRIPTION OF EMBODIMENTS

First Embodiment

Hereinafter, a display panel provided with a protective film according to a first embodiment of the present invention will be described with reference to FIGS. 1 and 2. Note that in all of the following drawings, for example, dimensions or ratios of respective components are appropriately changed to enable the drawings to be easily viewed.

In the following description, a display panel having a protective film on a surface thereof may be referred to as a "display panel provided with a protective film".

In addition, the display panel provided with a protective film after an indicator is mounted may be referred to as a "display panel provided with a protective film after an indicator is mounted".

Further, a display panel provided with an indicator after a protective film is removed from the display panel provided with the protective film after the indicator is mounted may be referred to as a "display device".

Figure 1:
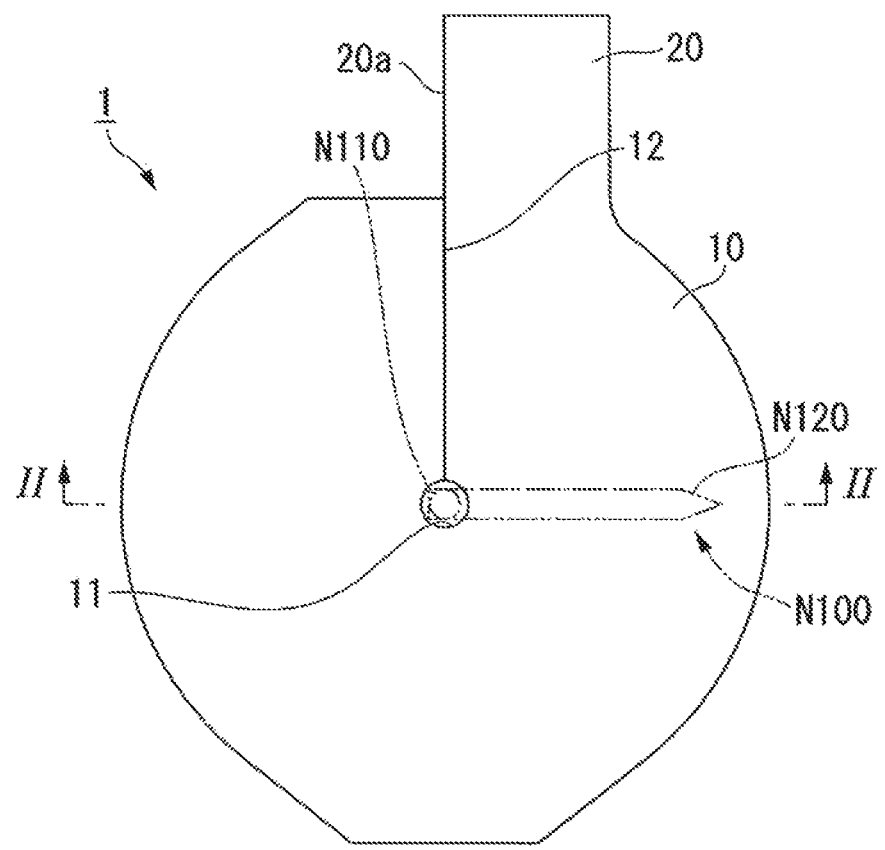
FIG. 1 is a plan view schematically illustrating a display panel 1 provided with a protective film according to a first embodiment.

FIG. 1 is a plan view schematically illustrating a display panel 1 provided with a protective film according to a first embodiment.

Figure 2:
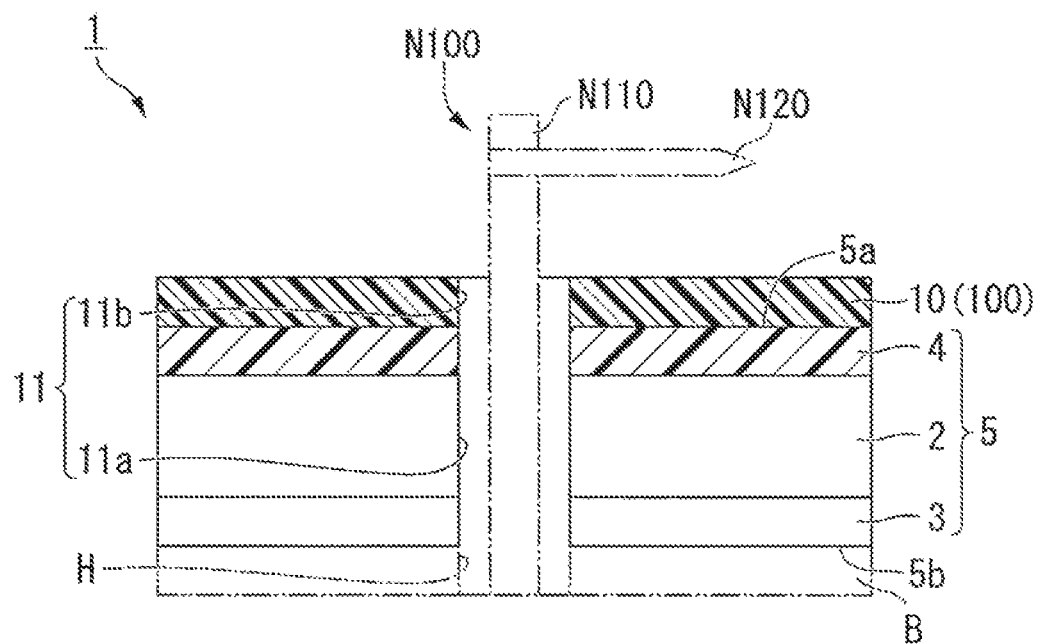
FIG. 2 is a sectional view taken along line II-II in FIG. 1.

FIG. 2 is a sectional view taken along line II-II in FIG. 1.

The display panel 1 provided with a protective film according to the present embodiment is used in a method of manufacturing a display device as described later. Examples of the display device suitably manufactured using the display panel 1 provided with a protective film according to the present embodiment include a smart watch and an in-vehicle meter.

The display panel 1 provided with a protective film according to the present embodiment includes a liquid crystal display panel 5 and a protective film 100 provided on a display surface 5a of the liquid crystal display panel 5, as illustrated in FIGS. 1 and 2. Note that the liquid crystal display panel 5 according to the present embodiment corresponds to a display panel in the claims.

Central portions of the liquid crystal display panel 5 and the protective film 100 are provided with a through-hole 11 passing through the liquid crystal display panel 5 and the protective film 100 in a thickness direction. Note that the number of through-holes 11 is not particularly limited and may be one or two or more.

In the present embodiment, in a method of manufacturing a display device as described later, a substrate B is mounted on a surface 5b opposite to the display surface 5a of the liquid crystal display panel 5. A central portion of the mounted substrate B is provided with a through-hole H passing through the mounted substrate B in the thickness direction.

[Liquid Crystal Display Panel]

The shape of the display surface 5a of the liquid crystal display panel 5 illustrated in FIG. 1 is substantially circular. The central portion of the liquid crystal display panel 5 is provided with a first through-hole 11a passing through the liquid crystal display panel 5 in the thickness direction.

The liquid crystal display panel 5 according to the present embodiment includes a liquid crystal cell 2, an optical film 4 provided on one surface of the liquid crystal cell 2, and a backlight 3 provided on a surface opposite to the one surface of the liquid crystal cell 2. Thus, the display panel 1 provided with a protective film according to the present embodiment is a transmissive liquid crystal display panel.

The optical film 4 according to the present embodiment is arranged on the display surface 5a of the liquid crystal display panel 5.

As the optical film 4, for example, a film that has an optical axis such as a polarizing film, a retardation film, an optical compensation film, a reflective polarization-type brightness enhancement film, a prism film, or the like, a film that does not have an optical axis such as a diffusion film or the like, and a film in which a plurality of films arbitrarily selected from these films are stacked may be used.

In the display panel 1 provided with a protective film according to the present embodiment, the optical film 4 is a polarizing film. Examples of the polarizing film used as the optical film 4 according to an embodiment include a film in which a dichroic dye is aligned in a polyvinyl alcohol resin.

[Through-Hole]

The through-hole 11 is for accommodating an indicator N100.

The indicator N100 includes a central shaft N110 inserted into the through-hole 11 and an indication pointer N120 provided at an end portion of the central shaft N110. The indicator N100 can be inserted into the through-hole 11 so that the indication pointer N120 is arranged on the display surface 5a side of the liquid crystal display panel 5.

In the indicator N100 used in the present embodiment, the indication pointer N120 extends in a direction intersecting with an extending direction of the central shaft N110. Examples of the indication pointer N120 include an hour hand, a minute hand, and a second hand used for a timepiece, an indication pointer used for a meter, or the like.

[Protective Film]

The protective film 100 according to the present embodiment is for protecting the liquid crystal display panel 5 by suppressing breakage of the liquid crystal display panel 5, adhesion of foreign matter, or the like at the time of manufacturing a display device as described later. In addition, in the display device at the time of completing a product, the protective film 100 is removed.

The protective film 100 illustrated in FIG. 1 includes only a first protective film 10. The first protective film 10 is arranged so as to overlap the liquid crystal display panel 5 in plan view.

A central portion of the first protective film 10 is provided with a second through-hole 11b passing through the first protective film 10 in the thickness direction. The first through-hole 11a and the second through-hole 11b described above are in communication with each other and form the through-hole 11 described above.

It is preferable that the first protective film 10 be a transparent film having high mechanical strength and good thermal stability. Examples of a material for forming the first protective film 10 include a cellulose acetate resin such as triacetyl cellulose (TAC) or diacetyl cellulose, an acrylic resin, a polyvinyl chloride resin, a polyester resin, a polyarylate resin, a cyclic polyolefin resin having a cyclic olefin such as norbornene as a monomer, polyethylene, polypropylene, polyolefin having a cyclic or norbornene skeleton or copolymers thereof, a resin having an imide and/or an amide as a main chain or a side chain, and the like.

A thickness of the first protective film 10 is, for example, about 0.5 to 200 μm.

The first protective film 10 according to the present embodiment may include an adhesive layer on a surface thereof facing the liquid crystal display panel 5. It is preferable that an adhesive constituting the adhesive layer be an acrylic adhesive.

The first protective film 10 according to the present embodiment includes a first grip portion 20 at a peripheral edge portion of the first protective film 10.

The first grip portion 20 according to the present embodiment is a portion that serves as a handle at the time of removing the first protective film 10 from the display panel 1 provided with a protective film after the indicator N100 is mounted.

The shape of the first grip portion 20 is not particularly limited but is, for example, rectangular.

The number of first grip portions 20 is not specifically limited but is preferably one in terms of reducing production time. In addition, the number of first grip portions 20 may be two or more.

The first protective film 10 according to the present embodiment includes a slit 12 that extends from the second through-hole 11b described above to an end side 20a of the first grip portion 20.

The slit 12 illustrated in FIG. 1 extends in a radial direction of the first protective film 10. In the present specification, "slit 12" corresponds to "dividing portion" in the claims.

As described above, in a case where the number of first grip portions 20 is two, when the slit 12 illustrated in FIG. 1 is at the 12 o'clock position, it is preferable that a slit 12 be provided additionally at the 6 o'clock position and that another first grip portion 20 be provided at the 7 o'clock position.

The slit 12 according to the present embodiment is exposed so as not to interference with the central shaft N110 when the first protective film 10 is removed from the display panel 1 provided with a protective film after the indicator N100 is mounted. For this reason, in the display panel 1 provided with a protective film according to the present embodiment, it is possible to easily remove the protective film 100 from the display panel 1 provided with a protective film after indicator N100 is mounted.

In addition, the first grip portion 20 illustrated in FIG. 1 is provided to the right of the slit 12. In general, workers are likely to be right-handed. In a case where a right-handed worker grips the first grip portion 20 with the worker's right hand, the first protective film 10 may be peeled off in a clockwise direction without the worker having to remove their right hand from the first grip portion 20. For this reason, the display panel 1 provided with a protective film according to the present embodiment is excellent in terms of workability.

The display panel 1 provided with a protective film configured as described above is obtainable by adhering the liquid crystal display panel 5 provided with the first through-hole 11a and the first protective film 10 provided with the second through-hole 11b to each other so that the first through-hole 11a and the second through-hole 11b are in communication with each other.

According to the display panel 1 provided with a protective film according to the first embodiment, it is possible to protect the display panel at the time of manufacturing the display device.

[Method of Manufacturing Display Device]

A method of manufacturing a display device using the display panel 1 provided with a protective film described above will be described.

Figure 3:
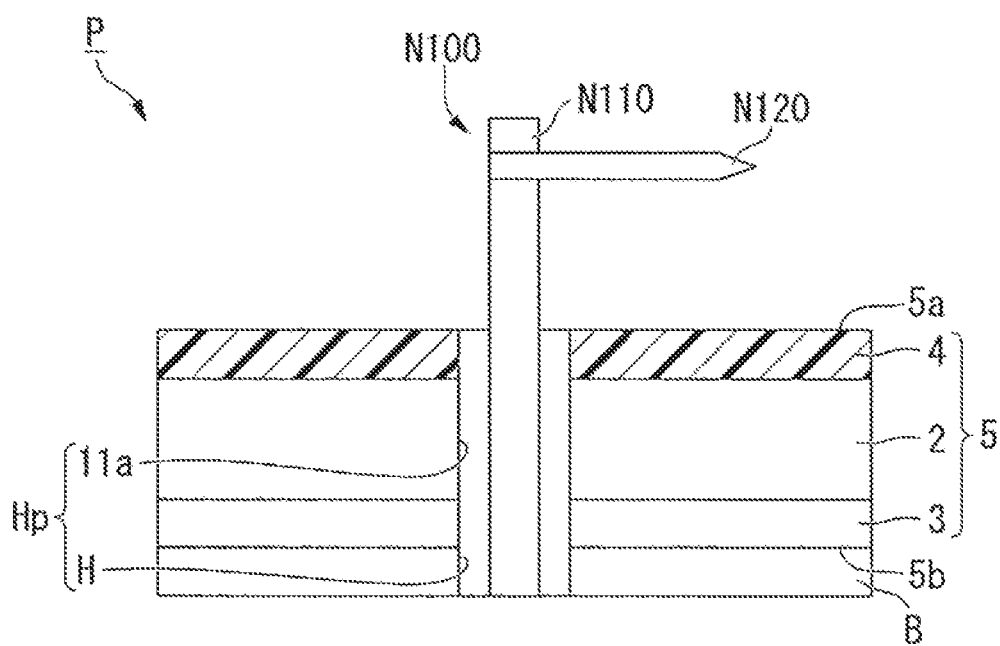
FIG. 3 is a sectional view of a display device P manufactured using the display panel 1 provided with a protective film according to the first embodiment.

FIG. 3 is a sectional view of a display device P manufactured using the display panel 1 provided with a protective film according to the first embodiment. Note that FIG. 3 corresponds to FIG. 2.

As illustrated in FIG. 3, the display device P obtained by a method of manufacturing a display device according to the present embodiment includes the liquid crystal display panel 5 and the substrate B provided on the surface 5b opposite to the display surface 5a of the liquid crystal display panel 5. The first through-hole 11a of the liquid crystal display panel 5 and the through-hole H of the substrate B are in communication with each other and form a through-hole $H_p$ of the display device P. The central shaft N110 of the indicator N100 is inserted into the through-hole $H_p$ of the display device P. The indication pointer N120 of the indicator N100 is arranged on the display surface 5a side of the liquid crystal display panel 5.

To manufacture the display device P having such a configuration, first, the central shaft N110 of the indicator N100 is inserted into the through-hole 11 of the display panel 1 provided with a protective film described above. In this case, the indicator N100 is inserted into the through-hole 11 so that the indication pointer N120 of the indicator N100 is arranged on the display surface 5a side of the liquid crystal display panel 5.

Next, the first grip portion 20 of the first protective film 10 is gripped, the slit 12 is exposed, and the first protective film 10 is peeled and removed in the clockwise direction so as to avoid the indicator N100. In this way, the display device P is manufactured.

Second Embodiment

Figure 4:
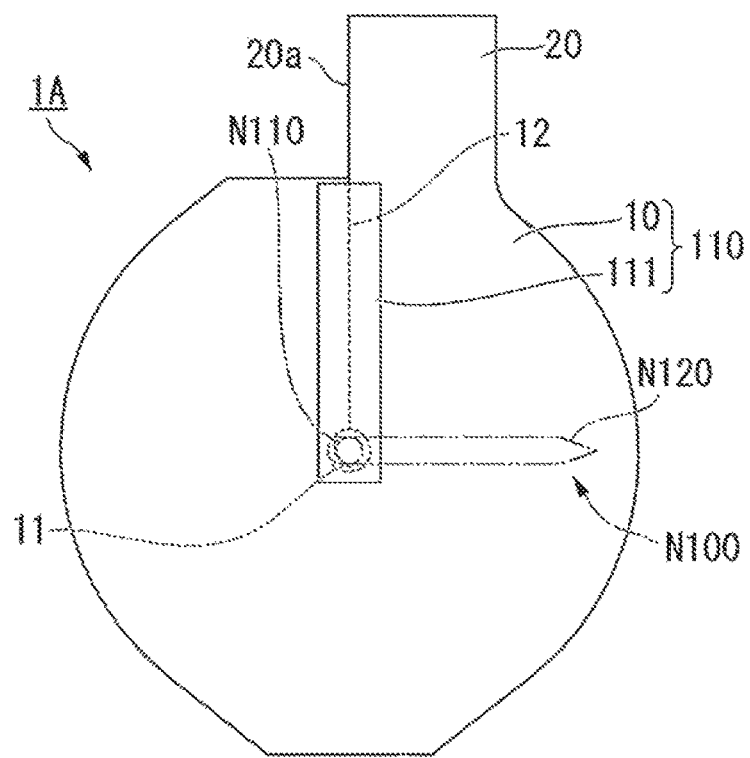
FIG. 4 is a plan view schematically illustrating a display panel 1A provided with a protective film according to a second embodiment.

Hereinafter, a display panel provided with a protective film according to a second embodiment of the present invention will be described with reference to FIG. 4. FIG. 4 is a plan view schematically illustrating a display panel 1A provided with a protective film according to a second embodiment. Note that FIG. 4 corresponds to FIG. 1.

As illustrated in FIG. 4, the display panel 1A provided with a protective film according to the second embodiment includes a liquid crystal display panel 5 and a protective film 110 provided on a display surface 5a of the liquid crystal display panel 5. The display panel 1A provided with a protective film according to the second embodiment differs from the display panel 1 provided with a protective film according to the first embodiment in a part of the configuration of the protective film. Therefore, in the present embodiment, components of a liquid crystal display panel 5 common to those of the first embodiment will be denoted by the same reference numerals, and detailed description thereof will be omitted.

The protective film 110 according to the present embodiment includes a first protective film 10 and a second protective film 111.

The second protective film 111 according to the present embodiment is arranged on a surface of the first protective film 10 opposite to the liquid crystal display panel 5.

The second protective film 111 according to the present embodiment covers at least a through-hole 11 and a slit 12. Thus, it is possible to suppress contamination with foreign matter from the through-hole 11 and the slit 12.

As a material for forming the second protective film 111, the same material as a material for forming the first protective film 10 may be used. The first protective film 10 and the second protective film 111 may be formed of different materials.

The shape of the second protective film 111 is not particularly limited but is, for example, rectangular.

In a method of manufacturing a display device P using the display panel 1A provided with a protective film, an indicator N100 is inserted into the through-hole 11 after the second protective film 111 is peeled and removed.

Processes after inserting the indicator N100 into the through-hole 11 are the same as those of the first embodiment. Thus, it is possible to suppress contamination with foreign matter from the through-hole 11 and the slit 12 before inserting the indicator N100.

According to the display panel 1A provided with a protective film according to the second embodiment, it is possible to protect the display panel at the time of manufacturing the display device P more effectively than in the first embodiment.

Third Embodiment

Figure 5:
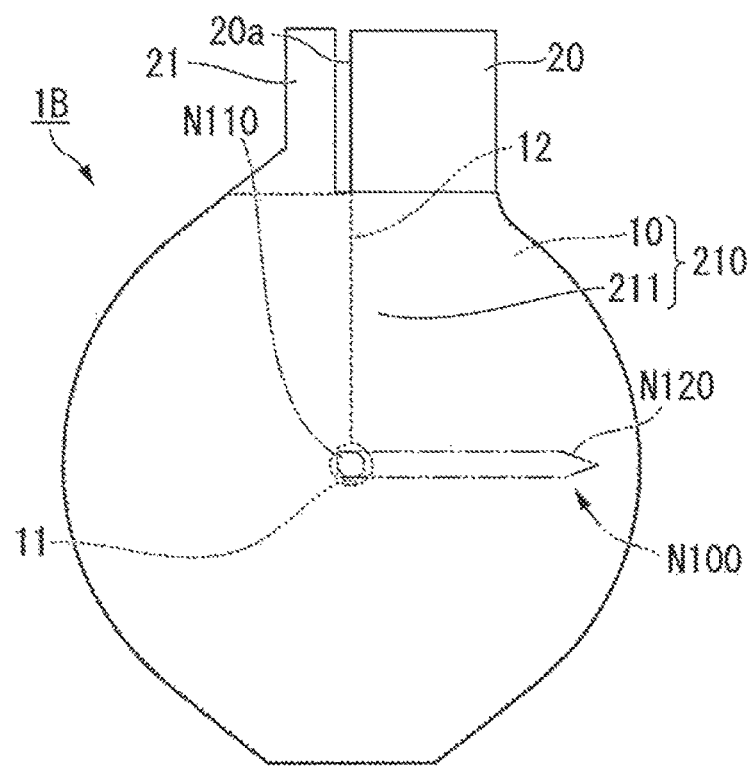
FIG. 5 is a plan view schematically illustrating a display panel 1B provided with a protective film according to a third embodiment.

Hereinafter, a display panel provided with a protective film according to a third embodiment of the present invention will be described with reference to FIG. 5. FIG. 5 is a plan view schematically illustrating a display panel 1B provided with a protective film according to a third embodiment. Note that FIG. 5 corresponds to FIG. 1.

As illustrated in FIG. 5, the display panel 1B provided with a protective film according to the third embodiment includes a liquid crystal display panel 5 and a protective film 210 provided on a display surface 5a of the liquid crystal display panel 5. That is, the display panel 1B provided with a protective film according to the third embodiment differs from the display panel 1A provided with a protective film according to the second embodiment in a part of the configuration of the protective film. Therefore, in the present embodiment, components of a liquid crystal display panel 5 common to those of the second embodiment will be denoted by the same reference numerals, and detailed description thereof will be omitted.

The protective film 210 according to the present embodiment includes a first protective film 10 and a second protective film 211.

The second protective film 211 according to the present embodiment is arranged on a surface of the first protective film 10 opposite to the liquid crystal display panel 5, similar to the second embodiment.

The second protective film 211 according to the present embodiment covers at least a through-hole 11 and a slit 12, similar to the second embodiment.

The second protective film 211 according to the present embodiment includes a second grip portion 21 at a position at which the second protective film 211 does not overlap the first protective film 10 in plan view. The second grip portion 21 is a portion that serves as a handle at the time of removing the second protective film 211 from the display panel 1B provided with a protective film. Thus, it is possible to remove the second protective film 211 from the display panel 1B provided with a protective film more easily than in the second embodiment.

The shape of the second grip portion 21 is not particularly limited but is, for example, rectangular.

According to the display panel 1B provided with a protective film according to the third embodiment, it is possible to protect the display panel at the time of manufacturing a display device P, similar to the second embodiment.

Although various embodiments of the present invention have been described hereinabove, the respective configurations, combinations thereof, and the like, in the respective embodiments are examples, and additions, omissions, and substitutions of components, and other modifications may be made without departing from the spirit of the present invention. In addition, the present invention is not limited by the embodiments.

For example, the transmissive liquid crystal display panel 5 has been illustrated as an example of the display panel according to an aspect of the present invention in the embodiment described above, but a reflective liquid crystal display panel may be used. In addition, the display panel according to an aspect of the present invention may be a display panel other than the liquid crystal display panel and may be, for example, an organic electroluminescence (EL) display panel.

In addition, for example, a display panel in which the protective film according to an aspect of the present invention is provided only on the display surface 5a of the liquid crystal display panel 5 has been illustrated as an example of the display panel provided with a protective film according to an aspect of the present invention in the embodiment described above, but the present invention is not limited thereto. For example, a protective film may also be provided on the surface 5b opposite to the display surface 5a of the liquid crystal display panel 5. This protective film may be provided with a through-hole passing through the protective film in the thickness direction.

Further, for example, a case where the first grip portion 20 of the first protective film 10 is provided on one side of the slit 12 (the 1 o'clock position when the slit 12 is at the 12 o'clock position) has been illustrated in the embodiment described above, but the present invention is not limited thereto. For example, the first grip portion 20 may be provided on the other side of the slit 12 (the 11 o'clock position when the slit 12 is at the 12 o'clock position).

Further, for example, a case where the shape of the display surface 5a of the liquid crystal display panel 5 is irregular has been illustrated in the embodiment described above, but the present invention is not limited thereto. The shape of the display surface 5a of the liquid crystal display panel 5 may be, for example, triangular, quadrangular, polygonal, circular, or elliptical.

Further, for example, an indicator in which the central shaft N110 and the indication pointer N120 are integrated with each other has been illustrated as an example of the indicator mounted in the display panel provided with a protective film according to an aspect of the present invention in the embodiment described above, but the present invention is not limited thereto. For example, an indicator in which the central shaft and the indication pointer are separate members may be used, and the central shaft and the indication pointer may be mounted separately in the display panel provided with a protective film according to an aspect of the present invention.

Further, for example, the slit 12 has been illustrated as an example of a dividing portion according to an aspect of the present invention in the embodiment described above, but the dividing portion may be a perforation. In the present specification, "perforation" refers to a plurality of holes formed along an imaginary line extending from the through-hole to the end side of the first gripping portion. In a case where the perforation is provided in the display panel provided with a protective film according to an aspect of the present invention, it is possible to peel and remove the first protective film 10 in a clockwise direction so as to avoid the indicator N100 by gripping the first grip portion 20 of the first protective film 10 and exposing the perforation.

INDUSTRIAL APPLICABILITY

An aspect of the present invention is applicable to, for example, a display panel provided with a protective film used to protect a display panel at the time of manufacturing the display device.

REFERENCE SIGNS LIST 1, 1A, 1B display panel provided with protective film
5a display surface
10 first protective film
11 through-hole
11a first through-hole
11b second through-hole
12 slit
20 first grip portion
20a end side
21 second grip portion
100, 110, 210 protective film
111, 211 second protective film

The invention claimed is:

1. A display panel provided with a protective film, comprising:
a display panel; and
the protective film that is provided on a polarizer surface of the display panel, wherein
the display panel is provided with a first through-hole passing through the display panel in a thickness direction,
the protective film includes a first protective film,
the first protective film is provided with a second through-hole passing through the first protective film in the thickness direction,
the first through-hole and the second through-hole are in communication with each other and form a through-hole,
the first protective film includes a first grip portion at a peripheral edge portion of the first protective film, and
the first protective film includes a dividing portion that continues from the second through-hole to an end side of the first grip portion.

2. The display panel provided with the protective film according to claim 1, wherein
the first grip portion protrudes from the peripheral edge portion of the first protective film in a direction away from the second through-hole, and
the dividing portion extends in a straight line from the second through-hole to the end side of the first grip portion.

3. A display panel provided with a protective film, comprising:
a display panel; and
the protective film that is provided on a display surface of the display panel, wherein
the display panel is provided with a first through-hole passing through the display panel in a thickness direction,
the protective film includes a first protective film,
the first protective film is provided with a second through-hole passing through the first protective film in the thickness direction,
the first through-hole and the second through-hole are in communication with each other and form a through-hole,
the first protective film includes a first grip portion at a peripheral edge portion of the first protective film,
the first protective film includes a dividing portion that continues from the second through-hole to an end side of the first grip portion,
the protective film includes a second protective film on a surface of the first protective film opposite to the display panel, and
the second protective film covers at least the through-hole and the dividing portion.

4. The display panel provided with the protective film according to claim 3, wherein the second protective film includes a second grip portion at a position at which the second protective film does not overlap the first protective film in plan view.

5. A display panel provided with a protective film, comprising:
an organic electroluminescence display panel; and
the protective film that is provided on a display surface of the organic electroluminescence display panel, wherein
the organic electroluminescence display panel is provided with a first through-hole passing through the organic electroluminescence display panel in a thickness direction,
the protective film includes a first protective film,
the first protective film is provided with a second through-hole passing through the first protective film in the thickness direction,
the first through-hole and the second through-hole are in communication with each other and form a through-hole,
the first protective film includes a first grip portion at a peripheral edge portion of the first protective film,
the first protective film includes a dividing portion that continues from the second through-hole to an end side of the first grip portion,
the first grip portion protrudes from the peripheral edge portion of the first protective film in a direction away from the second through-hole, and
the dividing portion extends in a straight line from the second through-hole to the end side of the first grip portion.

* * * * *